United States Patent [19]
Youngblood

[11] 3,980,099
[45] Sept. 14, 1976

[54] VALVE GUARD

[75] Inventor: Gurney V. Youngblood, Texas City, Tex.

[73] Assignee: Custom Iron & Specialties, Inc., Galveston County, Tex.

[22] Filed: June 11, 1975

[21] Appl. No.: 586,070

[52] U.S. Cl. ............................... 137/382; 137/384; 137/385
[51] Int. Cl.² .......................................... F16K 35/00
[58] Field of Search ................ 137/377, 382, 382.5, 137/385, 384

[56] References Cited
UNITED STATES PATENTS

| | | | |
|---|---|---|---|
| 961,959 | 6/1910 | Herfurth | 137/382 |
| 1,524,358 | 1/1925 | Johnson et al. | 137/382 |

*Primary Examiner*—Robert G. Nilson
*Attorney, Agent, or Firm*—Browning & Bushman

[57] ABSTRACT

A valve guard to prevent deliberate tampering with or accidental movement of a rotatable valve handle comprising a connecting member for connection to the valve body and a locking member pivotally connected to the connecting member for movement toward and away from the valve handle. The locking member includes first abutment means engageable with the valve handle in an open-valve position to lock the valve handle in the open-valve position and second abutment means engageable with the valve handle in a closed-valve position to lock the valve handle in the closed-valve position.

11 Claims, 5 Drawing Figures

U.S. Patent  Sept. 14, 1976  3,980,099
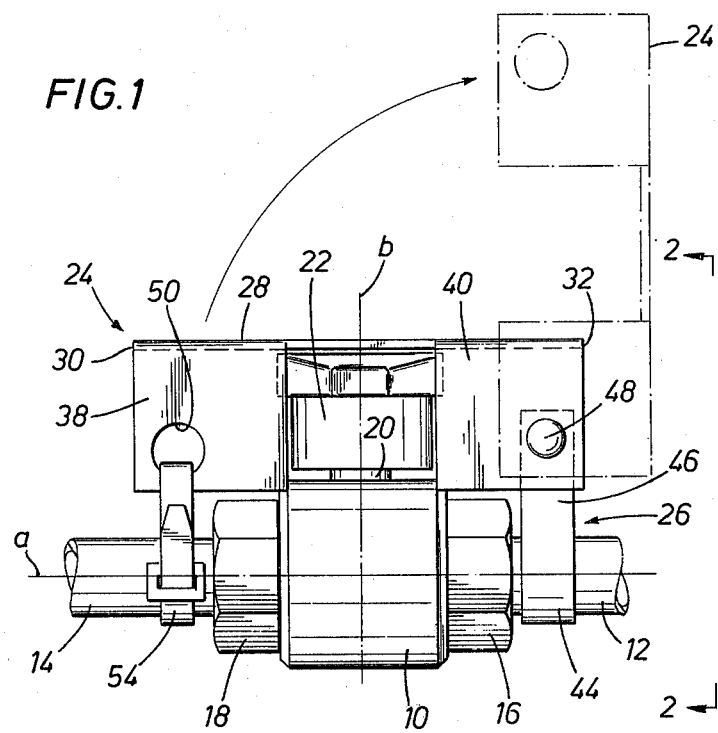
FIG.1
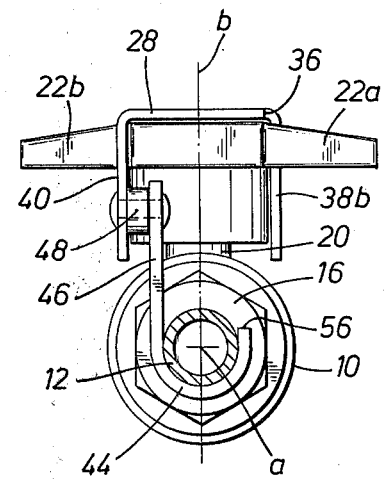
FIG.2
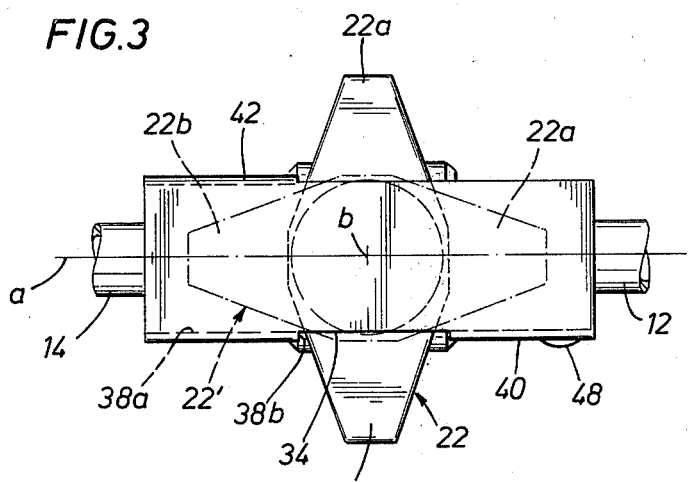
FIG.3
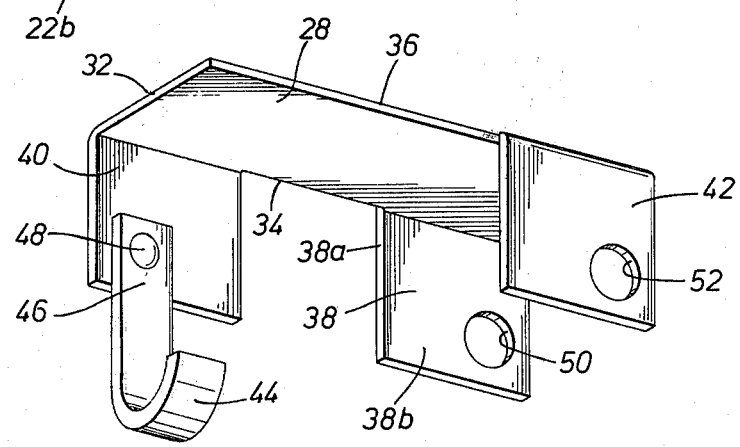
FIG.4
FIG.5

VALVE GUARD

BACKGROUND OF THE INVENTION

1. Field of the Invention

The present invention pertains to guards for valves having rotating valve elements such as butterfly valves, ball valves, etc. Such valves comprise a valve body having a flowway therethrough with the valve element disposed in the flowway to open and close the flowway by rotating the valve element between open and closed valve positions which are usually 90° apart. A valve stem rigidly connected to the valve element extends out through the valve body along the axis of the valve element generally perpendicular to the axis of the flowway. A valve handle is rigidly affixed to the outer part of the valve stem. By turning the valve handle, the handle, stem and valve element are all rotated about their common axis to open or close the valve. It will be appreciated that the valve handle will preferably be disposed in an easily accessible location. However, this expedient has the disadvantage of leaving the valve handle vulnerable to accidental movement as well as to deliberate unauthorized tampering.

2. Brief Description of the Prior Art

In the past, various seals, locks, guards, etc. have been developed for the handles of rotating valves. These have suffered from various disadvantages. For example, some guards, while fairly effective in preventing accidental movement or tampering by young children, can be readily released by an adult or older child without any special tools and thus allow deliberate tampering. Other guards are so designed that they must be completely removed from the valve for changing of the valve position by an authorized person. Many such guards were designed for one particular type of valve handle and are not readily applicable or adaptable to other types. Still another undesirable feature of most of the prior valve guards, locks, etc. is that they are relatively complicated and/or expensive to manufacture.

SUMMARY OF THE INVENTION

The valve guard of the present invention comprises a connecting member for connection to the valve body in a location spaced from the valve stem along the axis of the flowway of the valve. A locking member is pivotally connected to the connecting member for movement toward the valve handle to a locking position and away from the valve handle to a free position. The pivotal movement of the locking member to the free position allows authorized movement of the valve handle without removal of the guard from the valve and with little or no displacement of the connecting member. The locking member comprises first and second abutment means each of which is engageable with the valve handle in a respective one of its two positions to lock the handle in that position.

In the preferred embodiments of the invention, the valve guard comprises a cover plate which overlies the valve handle when the guard is in the locking position. The abutment means are formed by a first flange which depends perpendicularly from the cover plate to lie beside the valve handle in its potential path of motion when the locking member is in its locking position. The first and second abutment means are first and second surfaces of the first flange. Each of these surfaces is disposed beside the valve handle in its potential path of motion when the valve handle is in a respective one of its two positions. Additional flanges may depend from the cover plate, preferably parallel to the first flange, to form additional abutment means and/or to help maintain alignment of the guard on the valve.

It will be appreciated that, in addition to the abutment means preventing movement of the valve handle, the valve handle is at least partially covered by the locking member and thus further protected against bumps, etc.

The connecting member may comprise a loop portion for at least partially encircling a rigid member such as a conduit extending from the valve body along the axis of the flowway. The connecting member may cooperate with the locking member to define a slot for removal of the valve guard from the valve, or it may form a closed structure with the locking member for a more permanent installation. The connecting member is preferably disposed at one end of the locking member, and auxiliary connecting means may be provided at the other end.

The simplicity of the valve guard not only makes it inexpensive and easy to manufacture, but also durable and convenient to use. Furthermore, by varying the dimensions and spacing of the various parts of the guard, the invention can be adapted to many different types of rotating valves and handles.

Accordingly, it is a principle object of the present invention to provide a valve guard comprising a locking member and a connecting member pivotally connected to each other.

Another object of the invention is to provide a novel valve guard in which the locking member can be pivoted to a free position in which the valve handle can be rotated with little or no displacement of the valve guard.

A further object of the invention is to provide a valve guard which is simple and economical.

Still another object of the invention is to provide a type of valve guard which is applicable to many different types of rotating valve handles.

Other objects, features, and advantages of the invention will be made apparent by the following detailed description of the preferred embodiments, the drawings, and the claims.

BRIEF DESCRIPTION OF THE DRAWING

FIG. 1 is a side elevation of a valve with the guard of the present invention mounted thereon.

FIG. 2 is an elevation of the apparatus of FIG. 1 on lines 2—2 of FIG. 1 but with the valve handle in another position.

FIG. 3 is a top plan view of the apparatus of FIG. 2.

FIG. 4 is a perspective view of the valve guard of FIGS. 1–3.

FIG. 5 is a fragmentary perspective view of a second embodiment of the valve guard of the invention.

DESCRIPTION OF THE PREFERRED EMBODIMENTS

Referring now to FIGS. 1–3 there is shown a rotary type valve having a valve body 10. Conduits 12 and 14 are connected to opposite ends of valve body 10 by respective nipples 16 and 18. A flowway (not shown) extends through the valve body 10, the flowways of the conduits 12 and 14 and valve body 10 all having a common axis $a$. A valve element (not shown) is rotatably mounted in the valve body 10 on an axis $b$ perpendicular to axis $a$. Rigidly connected to the valve element and extending out of the valve body 10 along the axis $b$ is a valve stem 20. A valve handle 22 having opposite arms 22a and 22b is rigidly attached to the valve stem 20 outside the valve body 10. The valve element can be rotated to effect opening or closing of the valve by turning the handle 22 about the axis $b$. In FIG. 3 the valve handle 22 is shown in the closed-valve position in solid lines and in the open-valve position in phantom lines at 22′.

The valve guard comprises a locking member indicated generally at 24 and a connecting member indicated generally at 26. The locking member 24 comprises a cover plate 28 having respective first and second ends 30 and 32 and respective first and second side edges 34 and 36. Locking member 24 also comprises three generally parallel flanges 38, 40 and 42 which are integral with and depend perpendicularly from cover plate 28.

The connecting member 26 comprises a rigid J-shaped element including a loop portion 44 and leg 46. Leg 46 is pivotally connected to flange 40 by a rivet 48 so that the connecting member 26 is disposed adjacent the second end 32 of the cover plate 28. Flanges 38 and 42 have respective apertures 50 and 52 for receipt of an auxiliary connecting means, to be described more fully below, adjacent the first end 30 of the cover plate 28.

The loop portion 44 of the connecting member 26 partially encircles the conduit 12 so that the connecting member 26 is connected to the valve body 10 via the conduit 12. It will be appreciated that, depending on the configuration of the particular valve, the connecting member may be connected directly to the valve body 10 or to the nipple 16. In any event, the connecting member will be directly connected to some member which forms an extension of the valve flowway and which is integral with, i.e. part of or attached to, the valve body so that connecting member 26 is connected to the valve body 10, either directly or indirectly, at a location spaced from valve stem 20 along axis $a$.

The locking member 24 can be pivoted with respect to connecting member 26 from a locking position, shown in solid lines in FIG. 1, to a free position, shown in phantom in FIG. 1 at 24′. The plane of pivotal movement of locking member 24 is generally parallel to the flanges 38–42 and perpendicular to the plane of movement of the valve handle 22. At this point, it should be noted that the locking member 24, like the valve handle 22, is three dimensional, and cannot truly lie in a plane or define a plane as it moves. However, it will be noted that any given point on the locking member will define a plane as the locking member moves, and the planes defined by the various points will all be parallel. "The plane of movement" of the locking member, as used herein, will refer to a plane passing through the locking member and parallel to the planes defined by the various points of the locking member as it moves. As viewed in FIG. 1, the plane of movement of the locking member will be a vertical plane such as the one containing axes $a$ and $b$. Similarly, the plane of movement of the valve handle 22, as viewed in FIG. 1, will be a horizontal plane through the valve handle parallel to axis $a$ and perpendicular to axis $b$.

The locking member 24 can be placed in its locking position with the valve handle 22 in either the open-valve or closed-valve position. In either case, the cover plate 28 overlies at least a portion of the valve handle 22 and the flanges 38–42 are each disposed beside one or the other of the arms 22a, 22b. Each of the flanges 38–42 is located adjacent one or the other of the ends of the cover plate 28. The flanges 40 and 42 on the same side 34 of the cover plate 28 are spaced apart. This allows the arms 22a and 22b of the valve handle 22 to extend out from under the central portion of the cover plate 28 when the handle 22 is in closed-valve position as shown in FIG. 3.

Most rotary type valves include stop means which limit the rotation of the handles to 90°. For example, referring to FIG. 3, the handle 22 could be rotated in a counterclockwise direction from the position shown in dotted lines only as far as the position shown in solid lines. It could be rotated in a clockwise direction only from the solid line position to the dotted line position. Assuming that the valve shown in FIG. 3 has such stop means, flange 38 provides the abutment means for the valve guard. With the valve handle 22 in its open-valve or dotted line position, the interior surface 38a of flange 38 lies beside arm 22b in its potential path of motion (counterclockwise). Thus, surface 38a forms a first abutment means engageable with arm 22b to lock the valve handle 2 in the open-valve position. With the valve handle 22 in its closed-valve or solid line position, the edge surface 38b of flange 38 lies beside arm 22b in its potential path of motion (clockwise). Thus, surface 38b forms a second abutment means engageable with arm 22b to lock the valve handle 22 in its closed-valve position.

If the valve has stop means for the valve handle, the flanges 40 and 42 do not form abutment means, but do cooperate with flange 38 and cover plate 28 to align the locking member on the valve. If the valve should be without stop means, the flanges 40 and 42 would form abutment means which would in effect provide such stop means. The valve handle would always have two potential paths of motion, clockwise and counterclockwise. With the valve handle 22 in open-valve or dotted position, flange 42 would be engageable with arm 22b and flange 40 with arm 22a to prevent further clockwise rotation of the valve handle. Thus, flanges 40 and 42 would cooperate with flange 38 in comprising first abutment means to lock the valve handle in its open-valve position. With the valve handle 22 in its closed-valve or solid line position, flange 42 is engageable with arm 22a and flange 40 is engageable with arm 22b to prevent further counterclockwise rotation of the handle 22. Thus, flanges 40 and 42 cooperate with flange 38 in comprising second abutment means to lock the valve handle in its closed-valve position.

It will be appreciated that when the locking member 24 is in its locking position, the cover plate covers and protects at least a portion Furthermore, the top of the valve handle against bumps, etc. Futhermore, if the valve handle is in its open-valve position, the flanges cover and protect at least some of the sides of the arms of the valve handle.

An auxiliary connecting means can be passed through apertures 50 and 52 and around the conduit 14 and tightly fastened to hold the locking member 24 down in its locking position. Depending upon the disposition of the valve, the valve guard without the auxiliary connecting means 54 may be sufficient to prevent accidental movement of the valve handle 22 by bumping, etc. However, the auxiliary connecting means is helpful in deterring deliberate tampering with the valve. As shown, the auxiliary connecting means comprises a flexible strap with a buckle. The strap may have serrated edges so that it can be tightened in the buckle but not loosened. Then when it is desired to move the locking member to its free position, the strap can be cut. Many other auxiliary connecting means such as wires, padlocks, etc. can be used.

The loop portion 44 of the connecting member 26 has a free end 56 which, with the side edge 36 of the cover plate 28 defines a slot or opening opposite extension 46 through which the conduit 12 can pass when the locking member 24 is in its free position. Thus, the locking member and connecting member can be connected together before installation of the valve guard on the valve, and the valve guard can easily be removed if desired. It will further be appreciated that when the locking member 24 is in its free position, the valve handle 22 can be freely rotated between its open and closed valve positions without displacement of the connecting member longitudinally along conduit 12 or otherwise. In the embodiment of FIGS. 1-4 it will generally be preferable to place the flange 40, to which the connecting member 26 is attached adjacent that side edge of the cover plate 28 from which it will not interfere with the intended movement of handle 22 when the locking member 24 is in its free position. This side edge will be determined by the manner of rotation and open and closed valve positions of the handle. With the handle 22 as described above, the flange 40 is preferably located at the same side edge 34, i.e. on the same side of axis *a*, as the flange 38 which forms the abutment means. However, if the open and closed valve positions of handle 22 were reversed, with counterclockwise rotation still being used to close the valve and clockwise rotation to open it, the flange 40 would preferably be located diagonally from flange 38 adjacent end 32 and side edge 36.

A second embodiment of valve guard, designed for more permanent installation, is shown in FIG. 5. In this embodiment, flange 40' is in a position analogous to that of flange 40 in the embodiment of FIGS. 1-4. There is a fourth flange 58 disposed adjacent second end 32' and second side edge 36' of the cover plate 28' opposite flange 40'. The connecting member is U-shaped rather than J-shaped. It comprises a loop portion 44', a first leg 46' and a second leg 60 opposite leg 46'. The other parts of the guard of FIG. 5 are identical with the analogous parts of the guard of FIGS. 1-4. In this embodiment, the locking member and connecting member are provided separately. The locking member is first placed over the valve and the connecting member is placed in partial encircling relation to the conduit or another flowway extension. Leg 46' is then connected to flange 40' and leg 60 is connected to flange 58 by nuts and bolts or other suitable means so that the valve guard is permanently connected to the valve body and the locking member can pivot relative to the connecting member. The flange 58 will cooperate with another flange, in a position analogous to that of flange 38 in FIGS. 1-4, to form the abutment means regardless of whether or not the valve includes stop means for the valve handle. It will be appreciated that, depending on the dimensions of the valve and guard, the flange 58 of the embodiment of FIG. 5 may interfere with the rotation of the valve handle even when the locking member is in its free position. To alleviate this, the flange 58 may be cut away as at 64, and/or the connecting member may simply be displaced slightly along the axis of the flowway when the handle is being rotated. Flange 40' can also be cut away as at 66 if desired.

It will be appreciated that the valve guard of the present invention is simple to use and, because of its simplicity and freedom from delicate members such as springs, it is quite durable. It is also simple and economical to manufacture. The locking member can be stamped from a single piece of metal plate. The connecting member can be formed from a single metal strip. The only parts required are rivets or nuts and bolts or the like and, in some cases, a simple auxiliary connecting means.

It will further be appreciated that by varying the dimensions and positioning of the various parts of the device, the principles of the invention can be adapted for virtually any type of rotating valve handle. For example, for a wheel-like handle having radially extending spoke-like parts, the flanges could be disposed so as to abut these spoke elements to lock the valve in a desired position. Even with the type of valve handle shown in the drawing, the positioning of the flanges may have to be changed depending on the manner of rotation of the valve handle and its open and closed valve positions. It will also be appreciated that abutment means other than flanges might be employed.

It is thus intended that the scope of the invention be limited only by the claims which follow.

I claim:

1. A valve guard for use with a valve of the type comprising a valve body having a flowway therethrough, a valve stem extending from said valve body generally perpendicular to the axis of said flowway, and a valve handle rigidly affixed to said valve stem distal said valve body, said valve handle being rotatable about the axis of said valve stem between an open-valve position and a closed-valve position, said valve guard comprising:

a connecting member for connection to said valve body in a location spaced from said valve stem along the axis of the flowway of said valve, and a locking member pivotally connected to said connecting member for movement between a locking position and a free position, said locking member including first abutment means engageable with said valve handle when said locking member is in said locking position and said valve handle is in said open-valve position to lock said valve handle in said open-valve position, and second abutment means engageable with said valve handle when said locking member is in said locking position and said valve handle is in said closed-valve position to lock said valve handle in said closed-valve position.

2. The valve guard of claim 1 wherein said connecting member includes a loop portion for at least partially encircling a flowway extension of said valve body and a first leg depending from said loop portion, said locking member being pivotally connected to said first extension.

3. The valve guard of claim 2 wherein said loop portion of said connecting member includes a free end which, with a portion of said locking member, defines a slot generally opposite said first extension for installation and removal of said valve guard from said valve.

4. The valve guard of claim 2 wherein said connecting member includes a second leg disposed generally parallel to said first leg so that said loop portion and said legs form a generally U-shaped member, said locking member being pivotally connected to both of said legs.

5. The valve guard of claim 2 further comprising auxiliary connecting means for connecting said locking member to said valve body in said locking position, said connecting member and said auxiliary connecting means being disposed at opposite ends of said locking member.

6. The valve guard of claim 1 wherein said connecting member includes means for positioning said locking member such that the plane of the movement of said locking member is generally perpendicular to the plane of movement of said valve handle and wherein said locking member comprises a cover plate disposed to overlie at least a portion of said valve handle in said locking position and a first flange depending generally perpendicularly from said cover plate, generally parallel to the plane of movement of said locking member with respect to said connecting member, said first abutment means comprising one surface of said first flange disposed to lie beside said valve handle in a potential path of motion of said valve handle when said locking member is in said locking position, and said second abutment means comprising another surface of said first flange disposed to lie beside said valve handle in a potential path of motion of said valve handle when said locking member is in said locking position and said valve handle is in said closed-valve position.

7. The valve guard of claim 6 wherein said cover plate includes first and second ends for positioning on opposite sides of said valve stem along the axis of said flowway and first and second side edges for positioning on opposite sides of the axis of said flowway when said locking member is in said locking position, said first flange being disposed adjacent said first end and said first side edge, and said locking member further comprising a second flange depending generally perpendicularly from said cover plate adjacent said second end and pivotally connected to said connecting member.

8. The valve guard of claim 7 wherein said second flange is disposed adjacent said first side edge of said cover plate and said first and second flanges are spaced apart to allow a portion of said valve handle to protrude therebetween.

9. The valve guard of claim 7 wherein said locking member further comprises a third flange depending generally perpendicularly from said cover plate adjacent said first end and said second side edge of said cover plate.

10. The valve guard of claim 9 wherein said first and third flanges each have means defining an aperture for receipt of an auxiliary connecting means.

11. The valve guard of claim 9 wherein said locking member further comprises a fourth flange depending generally perpendicularly from said cover plate adjacent said second end and said second side edge and pivotally connected to said connecting member, said third and fourth flanges being spaced apart to allow a portion of said valve handle to protrude therebetween.

* * * * *

UNITED STATES PATENT OFFICE
CERTIFICATE OF CORRECTION

Patent No. 3,980,099    Dated September 14, 1976

Inventor(s) Gurney V. Youngblood

It is certified that error appears in the above-identified patent and that said Letters Patent are hereby corrected as shown below:

In Column 4, line 53 delete "furthermore" and insert --of--.

*Signed and Sealed this*

Fifteenth *Day of* February 1977

[SEAL]

*Attest:*

RUTH C. MASON
*Attesting Officer*

C. MARSHALL DANN
*Commissioner of Patents and Trademarks*